Patented Nov. 28, 1950

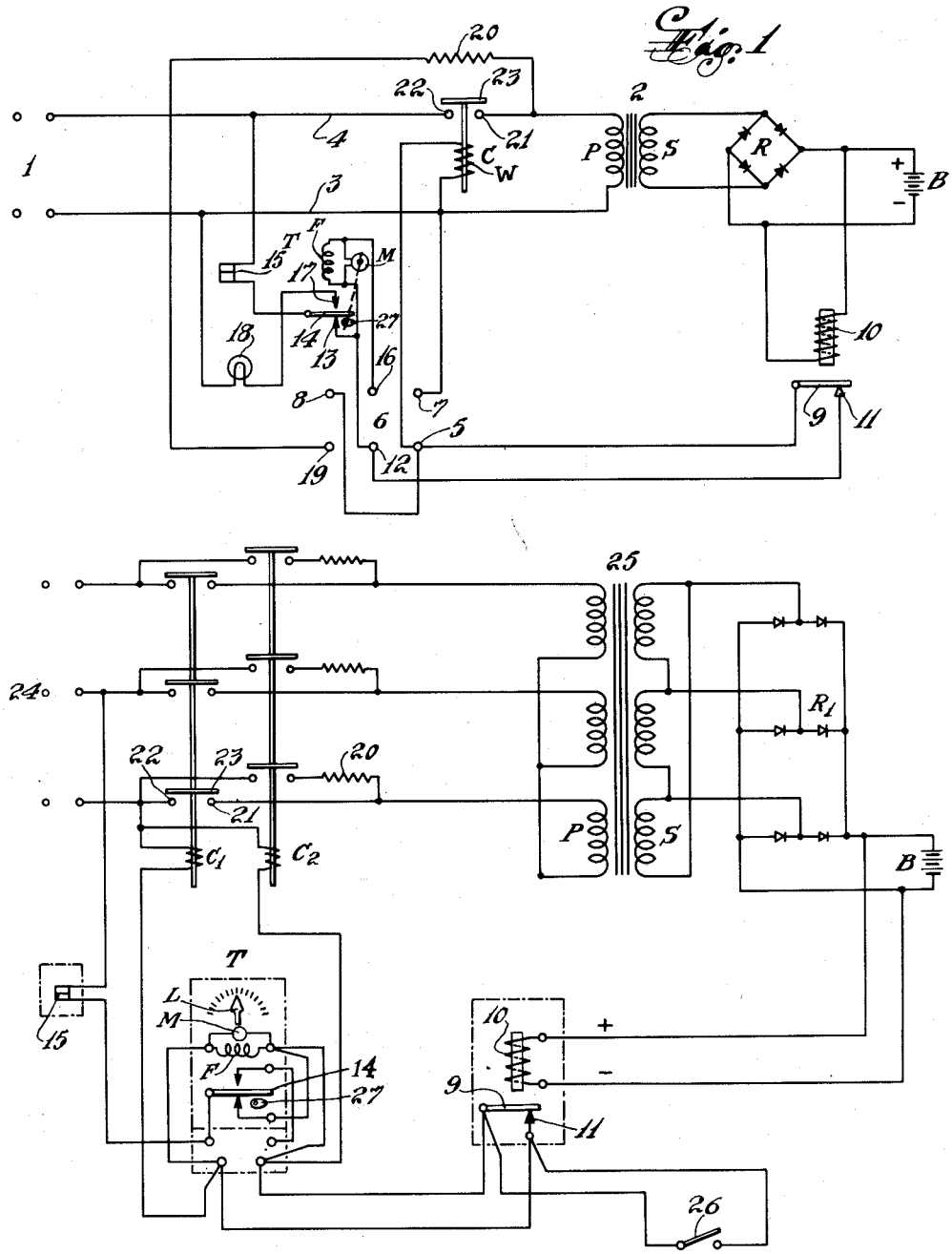

2,531,472

UNITED STATES PATENT OFFICE 2,531,472

BATTERY CHARGER

Alfred M. Salazar, West Islip, N. Y., assignor to Federal Telephone and Radio Corporation, New York, N. Y., a corporation of Delaware Application July 13, 1946, Serial No. 683,314

7 Claims. (Cl. 320—23)

This invention relates to means for charging two kinds of storage batteries, one kind being the lead acid type requiring in many cases a high charging rate for up to a certain stage and then automatically switching to a low charging rate. The other kind of a battery being one requiring a continuous high charging rate such as the Edison so called nickel plate battery.

It is one of the objects of my invention to provide means which when initially set into operation will charge either type of battery in accordance with the above-mentioned requirements.

So far as I am aware, it has been the practice heretofore to provide a plurality of electrical contactors, one for the high rate charge and one for the low rate charge, both contactors, however, being necessarily of high current rating. It is another object of my invention, therefore, to provide a circuit to replace one of these high current rated contactors with a low current rated contactor, thereby reducing the cost of such equipment.

Another object of my invention is to provide a circuit arrangement whereby the devices which control the operation of the contactors may be utilized without change in the circuits in which the main supply of current is either single or polyphase alternating current.

My improved battery charging means from alternating currents is illustrated in the annexed drawing wherein:

Figure 1 is a schematic view of the charging means connected to a single phase alternating current source of supply.

Figure 2 is a view similar to Figure 1 but showing the fundamental control device connected into a circuit from which the source of supply is three phase alternating current.

In the drawing wherein like numbers refer to corresponding parts 1 is a two pole switch for applying a single phase alternating current to the charging circuit through the medium of a "high current" contactor C, a transformer 2 having a primary P and secondary S and a rectifier R, the output side of which is connected to battery B. One side of the winding of the contactor C is connected to the supply line 3 while the other end of the said winding is connected to the contact 5 of a two pole double throw switch 6. Contact 7 of the switch 6 is connected directly to the supply lead 3. The contact 5 of the switch 6 is connected to contact 8 of the switch as well as to the armature 9 of a control relay 10. The cooperating contact 11 of the relay 10 is connected to the lever 12 of the switch 6, this lever being also connected to a field or exciting winding F of a synchronous motor M as well as to contacts 13 and 14 forming part of the timing mechanism. The contacts 13, 14 also operate as the "low current" contactor for control of the low charging rate.

The timer is connected through a thermostat device 15 to the supply lead 4. One end of the winding F is connected to the switch lever 16. The timer also has a contact 17 which is adapted to be engaged by the member 14 and is connected to a signal lamp 18, preferably red, that is connected to supply lead 3. The contact 19 of the switch 6 is connected to a resistor 20 one end of which is connected to the primary P of the transformer 2 as well as to a contact 21 of the contactor C. Another contact 22 of the contactor C is connected to the supply lead 4. The armature 23 of the contactor is adapted to complete a circuit across the contacts 21 and 22 as will be later explained. It will be noted that the winding of the relay 10 is connected across the battery B.

In the arrangement shown in Figure 1, when it is desired to charge a lead acid battery which is connected to the output side of the rectifier R the timer mechanism is set by a lever L (see Figure 2) for initially setting the timer mechanism T so that the contacts 13 and 14 are closed but the synchronous motor M will not operate because the field exciting winding F is initially shunted by the relay contacts 9 and 11 when the switch 6 is thrown to close the contacts 16 and 8 and 12 and 19. The closure of the switch 1 will then apply current through the thermostat device 15, contacts 14 and 13, switch contact 12, and contacts 11 and 9 of the relay 10, it being assumed that these contacts are normally closed when starting the charging operation, to contact 5 and through the winding W of the contactor C, closing armature 23 with contacts 21 and 22, to the supply line 3. With the connections just described, the battery B is charged at its high rate. It will also be noted that with contactor C closed, the circuit containing contacts 13—14 and resistor 20 is shunted.

The high charging rate continues until the voltage across each cell of the battery reaches approximately 2.3+ which represents an approximate charge into the battery of 85+%. The relay 10 is adjusted so as to respond to this charged voltage of the battery to open the contacts 9 and 11. This will remove the shunt from the winding F of the timer T and allow current to pass therethrough in series with the winding W, the current path being through elements 15, 14, 13, F, 16, 8, 5 and W. Windings F and W thus being connected in series, the high resistance of winding F reduces the current through winding W to such a low value as to render it inoperative, thereby causing contactors 21 and 22 to open. Current will then flow from the supply line 4 by way of the same contacts 14 and 13, contacts 12, 19 of the switch 6 through the resistance 20 and through the primary P of the transformer 2 back to the supply line 3 thereby cutting down the charging current of the battery B to a predetermined low rate. As soon as current starts to flow in the motor winding F as described by removal of the short circuit 9, 11, the motor M of timer T will start running. It will be understood that it is connected through a suitable reduction gearing so that it will run for a given length of time as indicated by the lever L before the cam 27, which is operated by a reduction gearing, is caused to move the member 14 into engagement with the contact 17 where it is held to light a signal lamp 18 and at the same time to cut the current off from the motor M. On resetting the timer again for another charging operation the contacts 13, 14 and 17 are moved to the position indicated in Figure 1. Since the timer mechanism per se forms no part of my invention, it is not described in detail.

When it is desired to charge an Edison nickel plate battery which is assumed to be connected to the rectifier R the switch 6 is thrown so as to connect the contacts 16 and 7 and 12 and 5. This will put the winding F of the motor M in parallel with the winding W across the lines 3 and 4. Winding W being thus energized closes contacts 21—23—22 completing the supply line 4 and consequently feeds maximum current to the battery continuously until the timer operates to open contacts 13 and 14, thereby deenergizing winding W and opening contactor C. This operation of timer T also completes contacts 14, 17 to energize the signal lamp 18. It will be noted that when the switch 6 is closed so as to connect the contacts 12 and 5 the relay contacts 9 and 11 will be shunted out, so that current will pass directly from the contact 5 to the winding W of the contactor C.

In Figure 2 the timer T and relay 10 operate as has been described with respect to Figure 1 but since the source of supply 24 is of the polyphase type, two contactors C1 and C2 may be required, each having contacts corresponding to 21 and 22 and armature 23 for each phase for supplying current to the three phased transformer 25, the secondary of which supplies the rectifier R1 connected to the battery B. Two contactors are desirable here since it is not feasible to have the three resistors in series with the winding F. The contactor C2, however, need only have a low current rating while C1 must have a high current rating.

In this arrangement the parts are illustrated in position for charging the battery B at the high rate except that the contacts of C1 and C2 are not closed. When the voltage of the battery attains the point described with respect to Figure 1, the contactor C1 is released in the same manner as described with respect to Figure 1 but the contactor C2 remains closed and will then be effective to introduce resistance 20 in series with the primary of the transformer 25 until the timer stops the charging as heretofore described with respect to Figure 1. While contactor C2 is shown separate from the timer contacts, it should be understood that they need not be separate except for practicalness of construction and operation. When it is desired to charge an Edison nickel battery the switch 26 is closed which places a short circuit around the contacts 9 and 11 for the same purpose as contacts 5 and 12 in switch 6 of Figure 1.

From the foregoing description it is clear that I have provided a control circuit for battery chargers which replaces one of the expensive high current contactors by a relatively inexpensive contactor of low current rating. While I have shown two embodiments of the circuit, many variations will be obvious to those skilled in the art. It is to be understood, therefore, that the embodiments shown and described are to be regarded as illustrative of the invention only and not as a limitation.

What is claimed is:

1. In a battery charger, a control circuit having two differently rated contactors, a first contactor to apply current to a battery at a high rate and a second contactor connected in series with a current limiting means to apply current at a low rate, said second contactor and current limiting means being connected in shunt to said first contactor whereby said second contactor will be ineffective upon closure of said first contactor, means responsive to a predetermined charge on the battery to open said first contactor to terminate the high charging rate whereby the charging will continue at said low rate through said second contactor and current limiting means, and timing means operative upon opening of said first contactor to actuate said second contactor at the end of a predetermined period of time to terminate the charging at said low rate.

2. A battery charger according to claim 1, wherein the source of current controlled by the contactors is single phase alternating current, and said low current contactor is contained as a part of said timing means.

3. A battery charger according to claim 1, wherein the source of current controlled by the contactors is a three phase alternating current and said low current contactor includes three sets of contacts the actuation of which is controlled by said timing means.

4. In a battery charger, a control circuit having two differently rated contactors, one to apply current to a battery at a high rate and the other to apply current at a low rate, a current limiting means in series with said other contactors and the battery, means connecting said contactors in parallel so that when the high current contactor is closed it shunts the low current contactor, means responsive to a predetermined charge on the battery to open the high current contactor to terminate the high charging rate to remove the shunt from said low current contactor, and initiate the low charging rate, and timing means operative upon opening of the high current contactor to open the low current contactor at the end of a predetermined period of time following the initiation of the low charging rate.

5. In a battery charger, a control circuit having two differently rated contactors, one to apply current to a battery at a high rate and the other to apply current at a low rate, a current limiting means in series with said other contactor and the battery, said series circuit being connected in shunt to said one contactor, means responsive to a predetermined charge on the battery to actuate the high current contactor to terminate the high charging rate and initiate the low charging rate, a timer, and means to selectively connect said timer in circuit to either actuate the low current contactor to terminate the low charging rate at the end of a predetermined period of time following the initiation of the low charging rate, or to control the length of time of the high charging rate independent of the particular charge on the battery.

6. In a battery charger, a battery charging circuit including a first contactor of high current rating, a second contactor of low current rating and a current limiter being connected in series with said first contactor connected thereacross so that when said first contactor is closed it shorts out said second contactor and limiter, a timer, means operable upon the pre-setting of said timer to close said second contactor to initiate operation of said battery charger, a relay, said relay being responsive to a predetermined charge on the battery to open said first contactor and to initiate operation of said timer, and said timer operating upon the elapse of a pre-set period to open said second contactor.

7. In a battery charger, a battery charging circuit including a first contactor of high current rating, a second contactor of low current rating, and a current limiter, said second contactor and said limiter being connected in series with said first contactor connected thereacross so that when said first contactor is closed it shorts out said second contactor and limiter, a timer, means operable upon the pre-setting of said timer to close said second contactor to initiate operation of said battery charger a relay to control said first contactor, a third contactor, means responsive to a predetermined charge on said battery to open said third contactor, and a control circuit including said first contactor, said third contactor and said relay energizable by the closing of said second contactor and de-energizable by the opening of said third contactor, the de-energization of said control circuit operating to de-energize said relay and cause said first contactor to open, whereby a low rate charging current is applied by said second contactor until said timer has operated for a period determined by the pre-setting thereof.

ALFRED M. SALAZAR.

REFERENCES CITED

The following references are of record in the file of this patent:

UNITED STATES PATENTS

| Number | Name | Date |
| --- | --- | --- |
| 838,822 | Thomson | Dec. 18, 1906 |
| 869,531 | Struble | Oct. 29, 1907 |
| 1,416,009 | Forshee | May 16, 1922 |
| 1,430,107 | Ogden | Sept. 26, 1922 |
| 1,962,484 | Dannheiser | June 12, 1934 |
| 2,058,829 | Rothe | Oct. 27, 1936 |
| 2,067,420 | Seeger et al. | Jan. 12, 1937 |
| 2,114,152 | Shaw | Apr. 12, 1938 |
| 2,157,910 | McCormick | May 9, 1939 |
| 2,227,118 | Amsden | Dec. 31, 1940 |
| 2,272,745 | Hinds et al. | Feb. 10, 1942 |
| 2,409,911 | Strong | Oct. 22, 1946 |